W. L. GRACEY.
Chain and Rope Tightener.

No. 217,091. Patented July 1, 1879.

UNITED STATES PATENT OFFICE.

WILLIAM L. GRACEY, OF PITTSBURG, PENNSYLVANIA.

IMPROVEMENT IN CHAIN AND ROPE TIGHTENERS.

Specification forming part of Letters Patent No. 217,091, dated July 1, 1879; application filed May 22, 1879.

*To all whom it may concern:*

Be it known that I, WILLIAM L. GRACEY, of Pittsburg, in the county of Allegheny and State of Pennsylvania, have invented a certain new and useful Improvement in Chain and Rope Tighteners; and I do hereby declare the following to be a full, clear, and exact description of the invention, such as will enable others skilled in the art to which it pertains to make and use it, reference being had to the accompanying drawings, which form part of this specification, in which—

Figure 1:
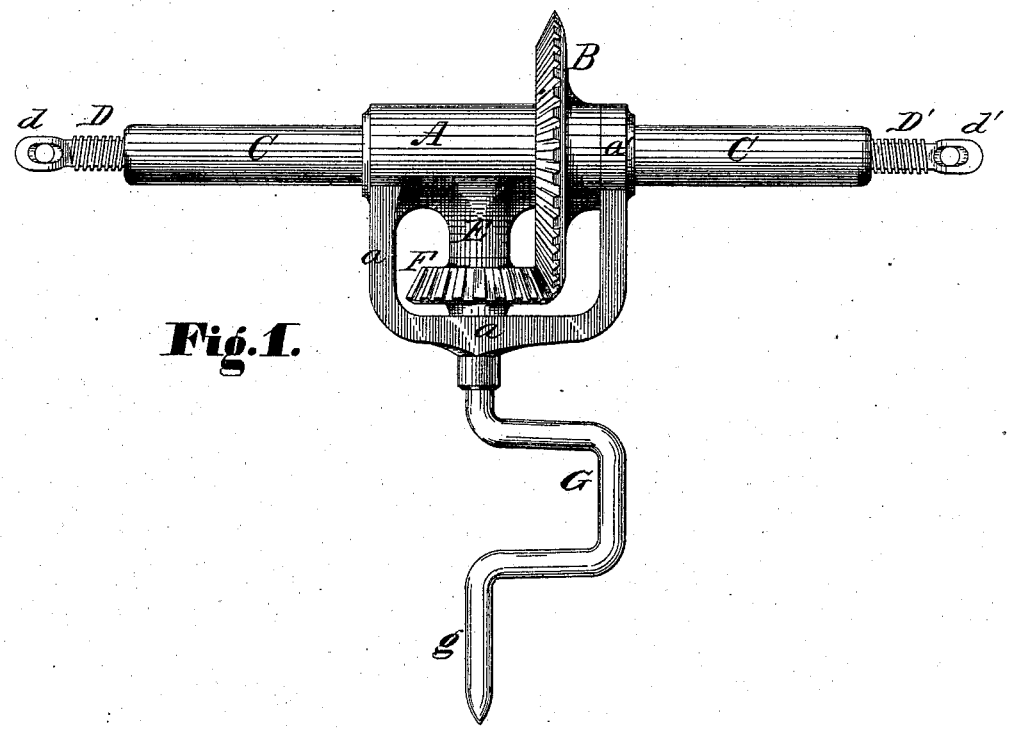
Figure 2:
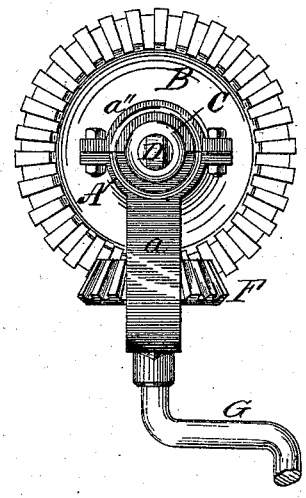

Figure 1 is a top view of my invention. Fig. 2 is an end view of its modified construction.

My object is to construct a tension device for adaptation to the tightening of ropes and chains, wherever such use may be desired, as in making up a fleet of barges, connecting boats together, or any analogous purpose.

It consists in the combination and construction of parts, as hereinafter described and claimed.

I construct a sleeve, A, having the bracket *a* extending out from it, and returning upon itself to form the bearing *a'*, as shown. Between the sleeve A and the bearing *a'*, I insert a beveled-gear wheel, B, and pass through it, the sleeve A, and bearing *a'* a long barrel, C, which is bored out and threaded, at the respective sides of the center, right and left handed. This barrel C is attached rigidly to wheel B by pins, key, or by shrinking, so that any motion of the wheel B will be partaken of by the barrel C. Into the respective ends of barrel C are screwed correspondingly-threaded rods D D', having eyes *d d'*, or other suitable means of connection with the parts of the chain or rope to be operated upon.

The chain or rope serves to prevent rods D D' from turning, so that if now the barrel C be revolved it will cause rods D D' to be either drawn together or forced apart, according to the direction in which the barrel C and wheel B revolve, thus tightening or slackening the chains or ropes to which said rods D D' are attached.

A bearing, E, projects from sleeve A toward the bracket *a*, and in this bearing and the bracket is set a beveled pinion, F, meshing with wheel B.

Pinion F is rigidly attached to a U-shaped crank, G, projecting from the bracket and terminating in the hand-piece *g*, which continues on the line of the axis of the crank. The purpose of this is as follows: Were an ordinary winch applied to pinion F, no effective use could be got out of it, as the bracket would wabble on the barrel and prevent the proper motion from being imparted from the hand; but by means of the hand-piece *g*, the operator can grasp it in one hand, thus steadying the sleeve and bracket, while he operates the crank with the other hand.

It is obvious that instead of the crank being permanent, it may be made with a wrench-head, and the shaft of pinion F made to fit, so that one crank may serve for any number of tighteners, thus avoiding the risk of unauthorized persons tampering with them.

The construction of parts may be modified by making as shown in Fig. 2, where half of the sleeve A, bracket *a*, and half of bearing *a'* are made in one piece, and the caps *a''* attached by bolts, as seen.

The whole construction is simple and inexpensive, and when operating no time is lost, as would be the case were a pawl-and-ratchet motion given.

The proportions of the two wheels may vary; but I prefer to have about two revolutions of the pinion produce one of the wheel B.

I claim as my invention—

The combination of right and left screw-rods D D', correspondingly-threaded rotary barrel C, wheel B, attached thereto, sleeve A, bearing *a'*, bracket *a*, and pinion F, with suitable means of revolving said pinion, substantially as described.

In testimony that I claim the foregoing I have hereunto set my hand this 17th day of May, 1879.

WILLIAM L. GRACEY.

Witnesses:
ROBERT GRACEY,
T. J. McTIGHE.